United States Patent [19]

Kitai et al.

[11] 4,211,480
[45] Jul. 8, 1980

[54] ELECTROMAGNETIC SHUTTER CONTROLLING DEVICE FOR CAMERA

[75] Inventors: Kiyoshi Kitai; Masaru Kobayashi; Tomoo Yonemoto; Shogo Kato, all of Shikawatashi, Japan

[73] Assignee: Seiko Koki Kabushiki Kaisha, Japan

[21] Appl. No.: 944,245

[22] Filed: Sep. 21, 1978

[30] Foreign Application Priority Data

Sep. 27, 1977 [JP] Japan ................................ 52/115891

[51] Int. Cl.$^2$ .......................... G03B 9/62; G03B 9/64; G03B 9/66
[52] U.S. Cl. .................................. 354/234; 354/237; 354/251
[58] Field of Search ............... 354/234, 235, 237, 251, 354/266, 268

[56] References Cited

U.S. PATENT DOCUMENTS

| 3,568,586 | 3/1971 | Rentschler | 354/234 |
|---|---|---|---|
| 3,821,769 | 6/1974 | Imura | 354/235 |
| 3,922,698 | 11/1975 | Petersen | 354/235 |
| 4,003,067 | 1/1977 | Brauning | 354/235 |

Primary Examiner—Donald A. Griffin
Assistant Examiner—Thomas H. Tarcza
Attorney, Agent, or Firm—Robert E. Burns; Emmanuel J. Lobato; Bruce L. Adams

[57] ABSTRACT

An electromagnetic shutter controlling device releases the shutter to start exposure when the device is energized and completes exposure when the device is deenergized.

The electromagnetic shutter controlling device is constituted of a shutter blade for opening and closing the shutter aperture, a first driving spring for closing or releasing the shutter blade, an electrical delay circuit for controlling exposure time, an electromagnetic device including an armature attracted by the magnetic force of the electromagnetic device and being connected to the electrical delay circuit, a second driving spring which is strained by the attraction of the armature so as to release or close the shutter blade when it is released, and a retaining member for keeping the shutter blade at the aperture closing position until it is actuated to release the shutter blade by the attraction of the armature.

The armature is actuated by the magnetic attraction of the electromagnetic device first to strain the second driving spring, then to release the stop restraining the shutter blade so that exposure is started. The electromagnetic device is deenergized after a predetermined period of exposure time controlled by the delay circuit to complete the exposure by releasing the armature to return to the resting position and by actuating the previously strained driving spring to drive the shutter blade to close the shutter aperture.

A trigger switch is closed simultaneously with the attraction of the armature to energize the delay circuit.

4 Claims, 11 Drawing Figures

FIG. 7b

ELECTROMAGNETIC SHUTTER CONTROLLING DEVICE FOR CAMERA

BACKGROUND OF THE INVENTION

This invention relates to an electromagnetic shutter controlling device for a camera. In particular, this invention relates to a shutter for a camera wherein an electromagnetic device including an armature and connected to an electrical delay circuit is provided for driving the system, the armature first charges the shutter and then releases the shutter successively to initiate an exposure while it is attracted by the electromagnet of the electromagnetic device. The exposure is maintained while the electromagnetic device is energized and the electromagnetic device is deenergized after a predetermined period of exposure time controlled by the delay circuit to complete the exposure by releasing the armature.

In the conventional shutter controlling device for a camera for controlling the exposure and having an electromagnetic device including an armature and connected to an electrical delay circuit, the shutter blade is directly engaged with the armature, when the electromagnetic device is energized by shutter releasing operation, the armature is attracted driving the shutter blade to open the shutter aperture while simultaneously straining a driving spring so that the driving spring will drive the shutter blade to close the shutter aperture when it is released, and the armature returns to the original position when the electromagnetic device is deenergized. This shutter of the conventional type has the following disadvantages, in the first place, that the movement of the armature is affected by frictional resistance and inertia of the shutter blade so that the time during which the armature moves a fixed distance becomes irregular, therefore, the time from the energizing of the electromagnetic device to the starting of the shutter blade and the time from the starting to the full open state of the shutter blade also become irregular so that the exposure time fluctuates at every exposure operation, and in the second place, that as the voltage of the battery for energizing the electromagnetic device drops, the electromagnetic force to attract the armature also drops so that foregoing the afore-mentioned fluctuation of the exposure time is amplified and at the same time, starting and full opening of the shutter blade is delayed due to slow movement of the armature resulting in under exposure.

These disadvantages are serious in photographing under natural lighting conditions where high shutter speed is used. The electromagnetic device of the shutter of this conventional type requires more than several hundred milli-amperes of electric current. The constant voltage device required for securing the aforesaid electric current is expensive and large sized. In case of such a large sized camera as a studio camera, the disadvantages of the conventional shutter may be overcome by the provision of a constant voltage device, however, in case of a small sized camera such as a portable camera, where the space for fitting the battery and the electromagnetic device is limited, no means has been developed to overcome those disadvantages.

SUMMARY OF THE INVENTION

Accordingly, an object of the invention is to provide an improved electromagnetic shutter controlling device.

In the present invention, a first driving spring drives a shutter blade to close (or to open) the shutter aperture; an armature is attracted by the magnetic attraction of an electromagnetic device, connected to an electrical delay circuit for controlling exposure time and energized at the shutter release operation, first to strain a second driving spring provided for driving the shutter blade to open (or to close) the shutter aperture, then to release a stop restraining the shutter blade so that exposure is started. The shutter blade is maintained to keep the shutter aperture fully opened while the armature is kept attracted and the shutter aperture is closed by the shutter blade which is driven by the first driving spring after a predetermined period of exposure time when the electromagnetic device is deenergized under control of the electrical delay circuit and the armature is returned to the original position. A trigger switch is provided to energize the delay circuit simultaneously with the attraction of the armature by the electromagnetic device.

Other objects and advantages of the present invention will become more readily apparent from a consideration of the description and drawings hereinafter.

DESCRIPTION OF THE PREFERRED EMBODIMENTS

Referring to FIGS. 1 to 4, a U-shaped yoke 1, formed of a magnetic material and having magnetic poles 1a and 1b, is fixed on the shutter base plate (not shown) by means of screws 1c and 1d. A coil 2 is wound on a bobbin (not shown) of a insulating material and mounted on the yoke 1. One end of the coil 2 is electrically connected to an output terminal of an electrical delay circuit (not shown). This delay circuit, including a switching circuit constituted of transistors and integrating condensers and other parts connected to the input terminal of the switching circuit, is a well known circuit for controlling a fixed exposure time by cutting off the electric current flowing through the coil 2 by inversing the switching circuit when the charging voltage of the condensers reaches a fixed level. An armature 3 is provided with a contact part 3a. A driving member 4 is fixedly provided with an upwardly vertical driving pin 4a, an upwardly fixed spring retaining pin 4b, a projection 4c and the armature 3 is attracted to the magnetic poles 1a and 1b when the yoke 1 is excited and rotatably fitted on a pin 5 upwardly and vertically fixed on the shutter base plate. A retaining member 6 is constituted of an edge portion 6a, a portion 6b touching the driving pin 4a of the driving member 4 and a spring retaining pin 6c fixed vertically on the retaining member. The retaining member 6 is rotatably fitted on the pin 5 over the driving member 4.

A coil spring 8 is rotatably fitted on the pin 5 over the retaining member 6. One arm of the coil spring 8 is engaged with the driving pin 4a of the driving member 4 and the other arm is engaged with the pin 6c of the retaining member 6 constraining the retaining member 6 to counterclockwise and forcing the portion 6b of the retaining member 6 normally touch the pin 4a of the driving member 4. A shutter blade 9, formed of an opening edge 9a, an edge 9b (FIGS. 1 and 4) normally touching the edge portion 6a of the retaining member 6, a slot 9c (FIGS. 3 and 4), a curved edge 9d (FIG. 4), upwardly fixed spring retaining pins 9e and 9f, an end portion 9g (FIG. 1) and a side edge 9h, is rotatably fitted on a pin 10 fixed upwardly and vertically on the shutter base plate.

An aperture 11 for receiving light from an object is provided on the shutter base plate. A shutter blade actuator 12 (FIGS. 3 and 4), formed of a downwardly and vertically fixed shutter blade driving pin 12a engaging in the slot 9c on the shutter blade 9, an edge portion 12b (FIG. 3) normally touching the edge portion 6a of the retaining member 6, an end portion 12c (FIG. 3), a projection 12d, side edges 12e and 12f, and upwardly fixed spring retaining pins 12g and 12h, is rotatably fitted on a pin 13 fixed upwardly and vertically on the shutter base plate. A first driving spring 14, one end of which being retained on the spring retaining pin 9e (FIG. 1) of the shutter blade 9 or the spring retaining pin 12g (FIGS. 3 and 4) of the shutter blade actuator 12 and the other end being secured to the shutter base plate, constrains the shutter blade 9 to close the aperture. A second driving spring 15 is retained at one end on the spring retaining pin 9f (FIG. 1) of the shutter blade 9 or the spring retaining pin 12h (FIGS. 3 and 4) of the shutter blade actuator 12 and at the other end on the spring retaining pin 4b of the driving member 4. A limiting pin 16, upwardly and vertically fixed on the shutter base plate, confines the closing position of the shutter blade 9. A limiting pin 17, fixed upwardly and vertically on the shutter base plate, confines the full opening position of the shutter blade 9. A trigger switch 18, constituted of a pair of contact pieces 18a and 18b electrically insulated from each other and fixedly provided on the shutter base plate, is connected in parallel to the integrating condenser of the delay circuit so as to start charging the condenser when the switch is opened. In this case, a one-motion delay circuit is employed.

Figure 5:
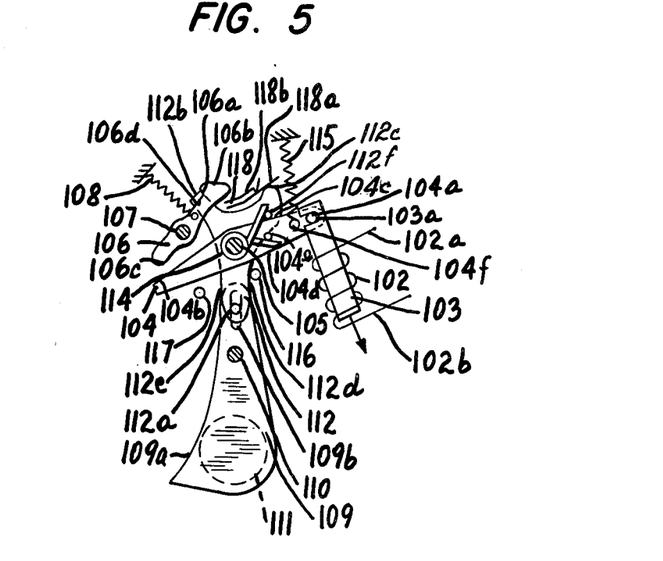

Referring to FIG. 5, a solenoid 102, formed on a hollow bobbin (not shown) of an insulating material fixed on the shutter base plate (not shown), is connected to the output terminal of the delay circuit at either ends 102a and 102b. A plunger 103 having a recess 103a is provided in the hollow of the bobbin so as to move in the direction shown by the arrow when the solenoid 102 is excited. The solenoid 102 and the plunger 103 constitute a well known plunger type electro-magnet. A driving member 104, provided with a pin 104a fixed upwardly and vertically and engaging with the recess 103a of the plunger 103 and upwardly fixed spring retaining pins 104e and 104f, having driving edges 104b and 104c, is rotatably fitted on a pin 105 fixed upwardly and vertically on the shutter base plate (not shown).

A retaining member 106, formed of an edge portion 106a, an inclined portion 106b, an edge portion 106c touching the driving edge portion 104b of the driving member 104 and a side edge portion 106d, is rotatably fitted on a pin 107 fixed upwardly and vertically on the shutter base plate and is constrained counterclockwise by a weak spring. A shutter blade 109 having an opening portion 109a and a slot 109b is rotatably fitted on a pin 110 fixed upwardly and vertically on the shutter base plate. A shutter aperture 111 provided on the shutter base plate receives light from an object on the film surface. A shutter blade actuator 112, provided with a downwardly and vertically fixed shutter blade driving pin 112a engaging in the slot 109c of the shutter blade 109 and an upwardly fixed pin 112f touching with the driving edge 104c of the driving member 104 and formed of an edge portion 112b raised upwardly so as to be in touch with the edge portion 106a and the side edge portion 106d of the retaining member 106, a projecting portion 112c and side edge portion 112d and 112e, is rotatably fitted on the pin 105 under the driving member 104.

A first driving spring 114 is rotatably fitted on the pin 105 over the driving member 104, and one arm of which is engaged with the pin 104e of the driving member 104 and the other arm is engaged with the pin 112f of the shutter blade actuator 112. A second driving spring 115, one end of which being engaged with the pin 104f of the driving member 104 and the other end being secured to the shutter base plate, constrains the driving member 104 counterclockwise and also constrains the shutter blade actuator 112 counterclockwise through the driving edge 104c and the pin 112f on the shutter blade actuator 112 and at the same time, keeps the plunger 103 at its original resting position. A limiting pin 116, fixed upwardly and vertically on the shutter base plate, confines the counterclockwise rotation of the shutter blade actuator 112 touching with the side edge 112d and also confines the clockwise rotation of the driving member 104 touching with the side edge 104d. A limiting pin 117, fixed upwardly and vertically on the shutter base plate, confines the clockwise rotation of the shutter blade actuator 112 forced by the second driving spring 115, touching with the side edge 112e. A trigger switch 118, constituted of a pair of contact pieces 118a and 118b electrically insulated from each other and fixedly provided on the shutter base plate, performs similarly to the trigger switch 18.

Operation of the system will be described hereinafter.

Figure 1:
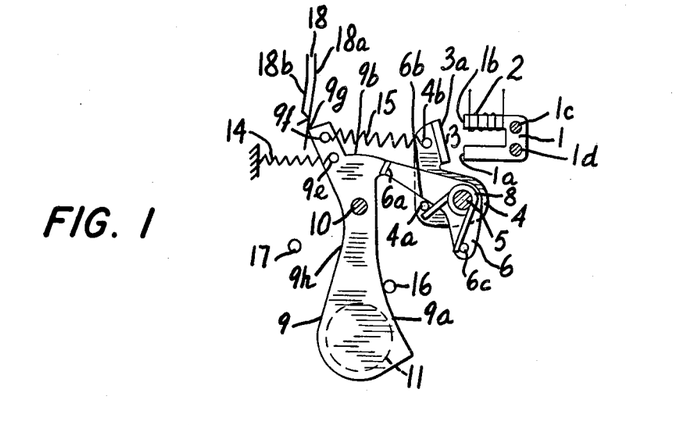
FIGS. 1 to 5, inclusive, are diagrammatic views of preferred embodiments of this invention.

FIG. 1 is a diagrammatic view of a first embodiment of the present invention wherein the armature of the magnetic device is formed of relatively thin plates having magnetic permeability.

Firstly, the shutter controlling device operation will be described without inclusion of the trigger switch 18. Operation of the shutter release button closes a shutter exposure motivating switch (not shown, designated as 'power switch' hereinafter) provided between the delay circuit as well as the solenoid 2 connected to the output terminal of the delay circuit and the battery (not shown) so that the solenoid 2 is energized. The yoke 1 excited by the energizing of the solenoid 2 attracts the armature 3. Consequently, the driving member 4 integral with the armature 3 is rotated clockwise while stretching or straining the second driving spring 15. After the second driving spring 15 has been stretched for a fixed length, the driving member 4 releases the contact between the edge portion 6a of the retaining member 6 driven by the driving member 4 through the contact between the driving pin 4a and the portion 6b and the raised edge 9b of the shutter blade 9, around the final range of its rotation. The armature 3 is attracted closely to the magnetic poles 1a and 1b of the yoke 1. When the shutter blade 9 is released, it is rotated clockwise by the spring force of the second driving spring 15 previously stretched exceeding the spring force of the first driving spring 14 until the side edge 9h comes in contact with the limiting pin 17, so that the aperture 11 is opened to start the exposure, while the first driving spring 14 is charged by reason of having been stretched by the rotation of the shutter blade 9. A fixed period of time after the power switch was closed, the delay circuit is inversed so that the solenoid 2 is deenergized and the yoke 1 is unmagnetized to cancel the magnetic attraction of the armature 3, consequently, the second driving spring 15 pulls back the driving member 4 rotating it counterclockwise and reducing the spring force. When the second driving spring 15 has contracted to provide a fixed reduced spring force, the spring force of the previously charged first driving spring 14, exceeding the weakened spring force of the second driving spring 15, rotates the shutter blade 9 counterclockwise until the opening edge 9a of the shutter blade 9 comes in contact with the limiting pin 16 so that the shutter aperture 11 is closed and the exposure is completed. During the course of closing rotation of the shutter blade 9, the rotation of the shutter blade 9 is obstructed at the edge 9b by the portion 6b of the retaining member 6, however, the edge 9b pushes the retaining member 6 clockwise independently of the driving member 4 against the torque provided by the spring 8 until it is retained by the edge 6a of the retaining member 6 as shown in FIG. 1 so that the shutter blade is reset for successive exposure.

Explanation will be made on the shutter controlling device provided with a trigger switch 18.

The contact pieces 18a and 18b of the trigger switch 18 are kept in contact with each other by the projecting portion 9g of the shutter blade 9 while the shutter aperture 11 is closed by the shutter blade 9 as shown in the drawings. When the shutter blade 9 is motivated by the aforesaid operation and rotates clockwise, the projecting portion 9g retracts from the contact piece 18a of the trigger switch 18 so that the trigger switch 18 is opened as the contact piece 18a separates the contact piece 18b by its own elasticity. When the trigger switch 18 is opened, the short circuiting of the integrating condenser is cancelled and charging of the condenser starts. When a fixed quantity of electricity is charged on the condenser, the delay circuit is inversed to cut off the electric current energizing the solenoid, thus controlling a fixed time. Provision of the trigger switch 18 delays the starting point of the fixed time control for a period of time between the switching-on of the power switch and the opening of the trigger switch 18. The performance of the device hereafter being similar to the aforementioned description, explanation will be omitted to avoid duplication. In this constitution of the shutter blade controlling device, the well known one-motion delay circuit, which remains inversed if it has been inversed after a period of time as long as the power switch remains closed, is employed. Provision of a delay circuit of this type prevents errorneous performance of the shutter blade controlling device that the yoke 1 is re-magnetized to actuate an exposure repeatedly as the delay circuit remains inversed if the trigger switch is closed by the counterclockwise rotation of the shutter blade 9 completing exposure as long as the power switch is closed.

In case a trigger switch 18 or 118 is provided in connection with the following embodiments, a one-motion delay circuit similar to that descrived hereabove can be utilized.

Figure 2:
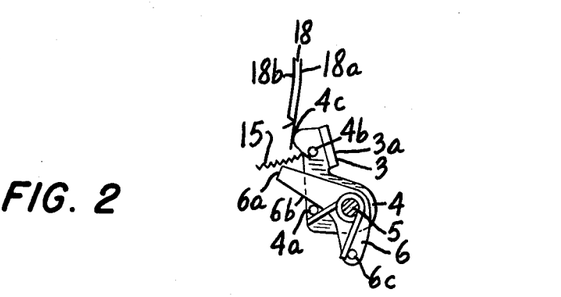

FIG. 2 shows a second embodiment of this invention. The second embodiment differs from the first embodiment by actuating the trigger switch 18 by means of the driving member 4. In the state as shown in the drawing wherein the shutter has not been released yet and the yoke 1 has not been magnetized yet, the contact pieces 18a and 18b of the trigger switch 18 are kept in contact with each other by the projecting portion 4c of the driving member 4. When the shutter is released, the solenoid 2 being energized, the magnetized yoke 1 attracts the armature 3, consequently, the driving member 4 rotates clockwise stretching the second driving spring 15 while the projecting portion 4c of the driving member 4 retracts from the contact piece 18a of the trigger switch 18, then the trigger switch is opened as the contact piece 18a separates from the contact piece 18b by its own elasticity cancelling the short circuiting of the integrating condenser of the one-motion delay circuit to start charging the condenser. The timing of retraction of the contact piece 18a from the contact piece 18b is preferably set around the end of the aforesaid rotation of the driving member 4. The following performance of the device being similar to the aforesaid description, explanation will be omitted to avoid duplication.

Figure 3:
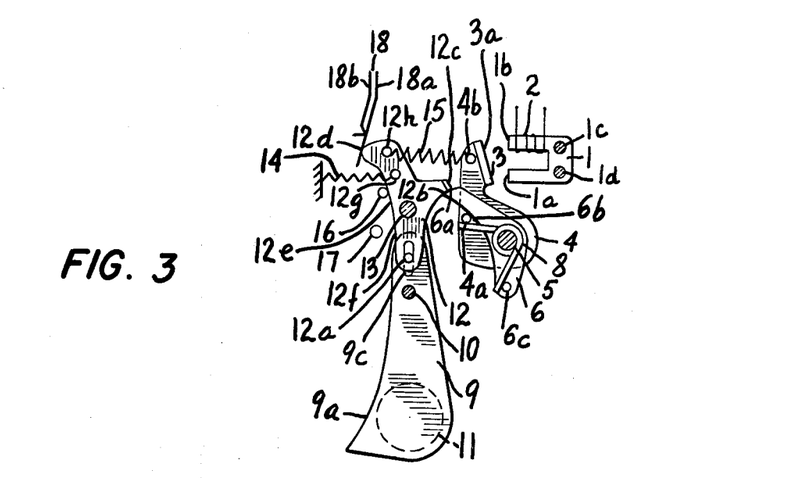

FIG. 3 is a diagrammatic view of a third embodiment of the invention. The third embodiment differs from the first embodiment by the additional provision of a shutter blade actuator 12 for opening and closing the shutter blade 9. Each end of the first and second driving springs 14 and 15 is retained on the shutter blade actuator 12 having a shutter blade driving pin 12a engaging in the slot 9c of the shutter blade 9. The retaining member 6 retains the shutter blade actuator 12 in order to restrain the shutter blade at the shutter aperture closing position until the driving member 4 has rotated for a fixed amount after it is started.

In the state as shown in the drawing, when the shutter release button is operated, electric current flows through the delay circuit and the solenoid 2 connected to the output terminal of the delay circuit so that the delay circuit is started and the magnetized yoke 1 attracts the armature 3 similarly to the first embodiment. Consequently, the driving member 4 integral with the armature 3 is rotated clockwise stretching the second driving spring 15. After the second driving spring 15 has been stretched to a fixed length, the driving member 4 releases the contact between the edge portion 6a of the retaining member 6 and the edge portion 12b of the shutter blade actuator 12 through the engagement between the driving pin 4a and the portion 6b of the retaining member 6 around the final stage of its rotation. The armature 3 is closely attracted to the magnetic poles 1a and 1b of the yoke 1. When the shutter blade actuator 12 is released, it is rotated clockwise until its side edge 12f comes in contact with the limiting pin 17 by the spring force of the stretched second spring exceeding the spring force of the first driving spring 14 which is stretched to the charged length by the rotation of the shutter blade actuator 12. The shutter blade 9 is rotated counterclockwise by the shutter blade actuator 12 through engagement of the shutter blade driving pin 12a in the slot 9c so that the shutter aperture 11 is opened to start exposure. After a fixed period of time, the delay circuit is inversed to cut off the electric current flowing through the solenoid 2 so that the yoke 1 is unmagnetized. When the armature 3 is released in accordance with the unmagnetization of the yoke 1, the second driving spring 15 retracts rotating the driving member 4 counterclockwise to bring back the armature 3 to the resting position. When the second driving spring 15 has contracted to have less spring force than that of the first driving spring 14, the first driving spring 14 rotates the shutter blade actuator 12 counterclockwise until the side edge 12e of the shutter blade actuator 12 comes in contact with the limiting pin 16, simultaneously rotating the shutter blade 9 clockwise to close the shutter aperture 11 and complete the exposure. During the course of return motion of the shutter blade actuator 12, the end portion 12c is obstructed by the portion 6b of the retaining member 6, however, the end portion 12c pushes the retaining member 6 clockwise independently of the driving member 4 against the torque provided by the spring 8 until it is retained by the edge 6a of the retaining member 6 as shown in the drawing so that the shutter blade is reset for successive exposure. The exposure time is controlled by actuating the one-motion delay circuit by the trigger switch 18 operated by the projecting portion 12d of the shutter blade actuator 12 as described in the first embodiment.

Figure 4:
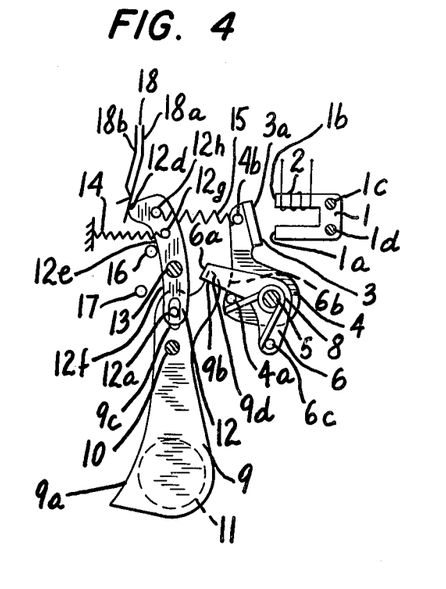

FIG. 4 shows a fourth embodiment of the present invention. This embodiment differs from the third embodiment by retaining the shutter blade 9 by means of the retaining member 6 as in the first embodiment at the aperture closing position until the driving member 4 has rotated for a fixed angle after it is started. The retention of the shutter blade 9 by the retaining member 6 by the engagement of the edge portion 6a with the edge 9b is released in accordance with the clockwise rotation of the retaining member 6 integral with the rotation of the driving member 4 rotated clockwise by the magnetic attraction of the armature 3. Consequently, the shutter actuator 12 is rotated clockwise by the second driving spring 15 stretched by the magnetic attraction of the driving member 4, while stretching the first driving spring 14, and actuates on the shutter blade 9 to start exposure rotating counterclockwise. The curved edge 9d of the shutter blade 9 is so formed as to rotate the retaining member 6 clockwise independently of the driving member 4 against the spring force of the spring 8 by sliding engagement of the curved edge 9d with the raised end of the edge portion 6a during the course of return motion of the shutter blade 9 closing the shutter aperture 11 until it is retained by the edge 6a of the retaining member 6 as shown in the drawing so that the shutter blade is reset for successive exposure. The following performance of the device being similar to that of the third embodiment, explanation will be omitted to avoid duplication.

FIG. 5 shows a fifth embodiment of the invention. The fifth embodiment differs from the first to fourth embodiment inclusive, by the employment of a plunger type electromagnet having a solenoid 102 and a plunger 103 as an armature and by the provision of a first driving spring 114 to open the shutter blade 109 and a second driving spring 115 to close the shutter blade 109 and also by the employment of the driving member 104 as a shutter blade actuating means as well as a driving means.

The power switch is closed in accordance with shutter release operation so that the solenoid 102 is excited to produce a magnetic force which actuates the plunger 103 to move in the direction shown by the arrow. During the course of the movement, the plunger 103 rotates the driving member 104 clockwise until the side edge 104d comes in contact with the limiting pin 116 while straining the first and second driving springs 114 and 115. During the rotation of the driving member 104, after the driving springs 114 and 115 have been strained for fixed amounts, respectively, and preferably around the end of its rotation, the driving edge 104b engages with the edge portion 106c of the retaining member 106 turning the retaining member 106 clockwise engagement of the edge portion 106a with the edge portion 112b of the shutter blade actuator 112. Consequently, the first driving spring 114 rotates the shutter blade actuator 112 clockwise. At the same time, the projecting portion 112c of the shutter blade actuator 112 retracts from the contact piece 118a of the trigger switch 118. The contact piece 118a separates from the contact piece 118b by its own elasticity. When the trigger switch 118 has been thus opened, the short circuiting of the integrating condenser is cancelled and charging of the condenser starts. At the same time, the shutter blade driving pin 112a on the shutter blade actuator 112 engaging in the slot 109b of the shutter blade 109 drives the shutter blade 109 counterclockwise to start exposure opening the shutter aperture 111. The shutter blade actuator 112 is stopped by the contact of the side edge 112e with the limiting pin 117 when the shutter blade has fully opened the shutter aperture 111.

In this state, there is a gap between the side edge 112d of the shutter blade actuator 112 and the limiting pin 116. After a fixed period of time when the integrating condenser of the delay circuit has been charged with a fixed amount of electricity, the delay circuit is inversed to cut off the electric current flowing through the solenoid 102, then the second driving spring 115 rotates the driving member 104 counterclockwise, simultaneously rotating the shutter blade actuator 112 counterclockwise through the driving edge 104c and the pin 112f on the shutter blade actuator 112, successively rotating the shutter blade 109 clockwise by the shutter blade driving pin 112a on the shutter blade 112 engaging in the slot 109b, thereby completing the exposure by closing the shutter aperture 111. On the other hand, the second driving spring 115 returns the plunger 103 to the original position through the pin 104a on the driving member 104. Accordingly, the side edge 112d of the shutter blade actuator 112 coming in contact with the limiting pin 116, the driving member 104, the shutter blade actuator 112 and the shutter blade 109 returning to and resting at the original positions, respectively, as shown in FIG. 5, the shutter control device is reset for the successive exposure. During the counterclockwise, rotation to return to the original position, the shutter blade actuator 112 rotates the retaining member 106 independently of the driving member 104 by sliding contact of the portion 102b with the inclined portion 106b of the retaining member 106 so that the shutter blade actuator 112 is retained by the retaining member at its original position as shown in FIG. 5. In case the device is not provided with the trigger switch 118, the charging of the delay circuit will be started simultaneously with the closing of the power switch as in the case of the first to fourth embodiments. To increase the electromagnetic force of the electromagnet used for this embodiment, a tubular core of a magnetic material may be inserted between the hollow of the solenoid bobbin (not shown) and the plunger so as to raise the magnetic flux density of the solenoid. In a modification of the preferred embodiment, the armature 3 used for the abovementioned embodiments may be secured to the driving member, for instance, adjacent to the pin 104a, and the magnetic pole of the yoke may be positioned opposite to the armature 3, or the first driving spring may be strained by the counterclockwise rotation of the driving member 104 by the second driving spring 115, that is the aperture closing process, by securing one arm of the first driving spring to the shutter base plate instead of retaining on the pin 104e of the driving member 104.

Figure 6A:
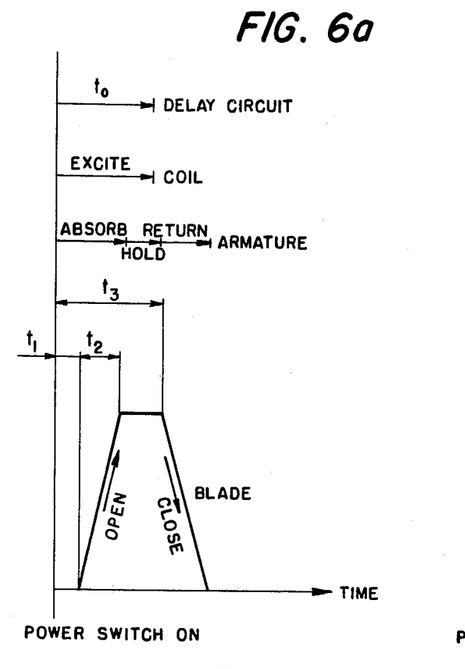
FIG. 6a, 6b is an operational diagram of a conventional shutter for a camera.
Figure 6B:
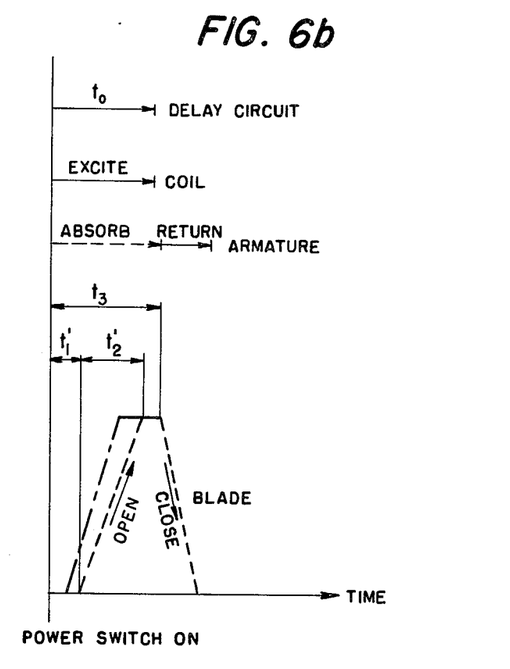
Figure 7A:
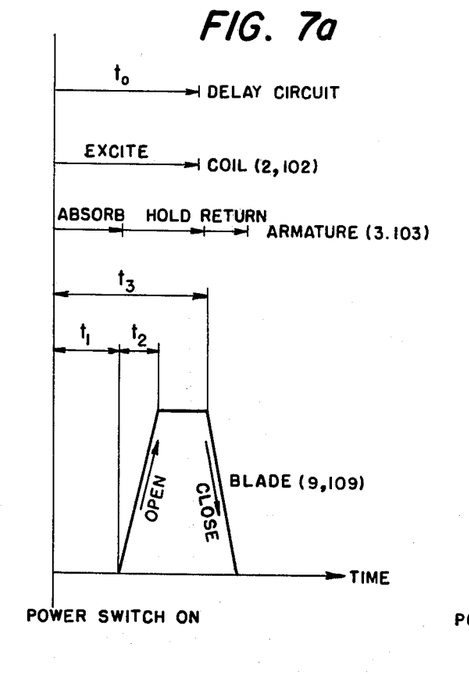
FIGS. 7a, 7b and 8a, 8b are operational diagrams of a shutter according to the present invention.
Figure 7B:
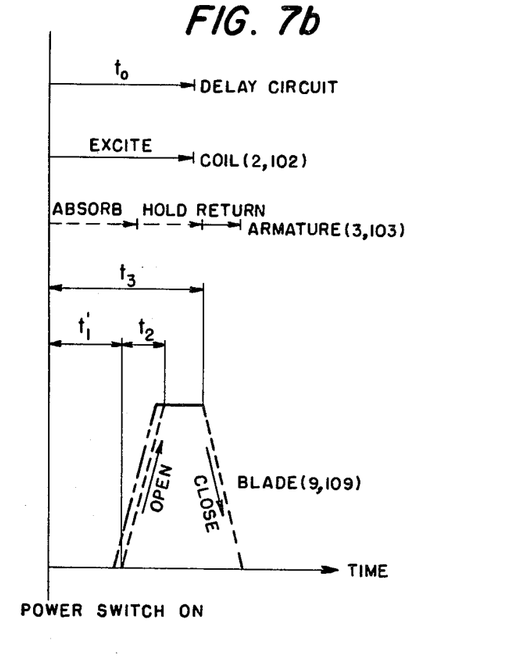
Figure 8A:
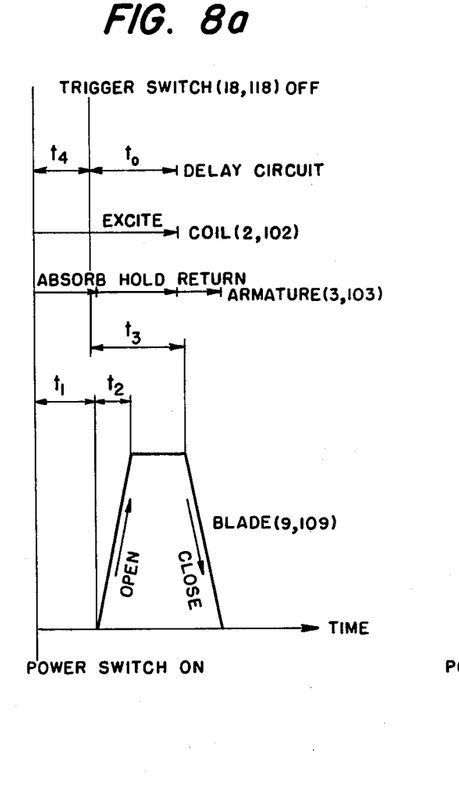
Figure 8B:
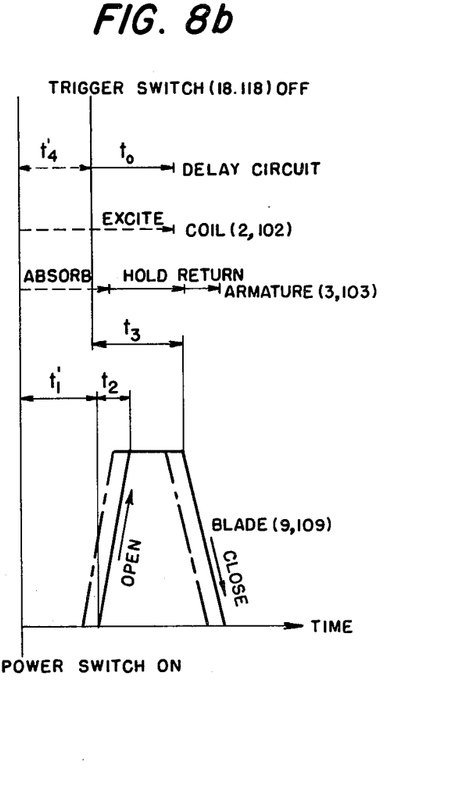

FIG. 6 is an operational diagram of the conventional shutter and FIGS. 7 and 8 are operational diagrams of the perferred embodiments according to the present invention.

FIG. 7 is the operational diagram of the device without the trigger switch and FIG. 8 is the operational diagram of the device provided with the trigger switch 18 or 118. FIG. 6 shows an operation of the conventional shutter wherein the shutter blade is connected directly to the armature. In each figure part, (a) shows the operation of the shutter when the device is powered with a new battery (for instance 6V) and Part (b) with a battery of dropped voltage (for instance 3V).

In general, shutter blades are so formed that the ratio of the distance between the center of rotation and the portion corresponding to the aperture to the distance between the center of rotation and the point of action of the shutter blade driving force is considerably large, so that the shutter blade rotation is affected by the inertia of the shutter blade in starting and in rotation and by the frictional resistance that will fluctuate at every operation. Accordingly the, exposure fluctuates at high shutter speeds often used in photographing under natural lighting because the time t1 from the starting of attraction of the aramature by closing the power switch in accordance with shutter release operation to the starting of the shutter blade and the time t2 from the starting of the shutter blade to the full opening of the aperture fluctuate at every exposure, because of the combined effects of the inertia of the shutter blade and the frictional resistance on the attraction of the armature performed by a limited electromagnetic force. It is apparent that the fluctuation of exposure will be increased by the provision of any additional member, such as a shutter blade actuating member, between the armature and the shutter blade, as additional frictional resistance will be generated at the junctions of the members. According to the present invention, the armature 3 or the plunger 103 only strains the driving springs for driving the shutter blade and the shutter blade actuator, then releases the retaining member 6 or 106 which is retaining the shutter blade actuator 12 or 112 and the shutter blade 9 or 109 but does not drive the shutter blade and the shutter blade actuator, the movement of which influences the accuracy of exposure, while being attracted and retained by the electromagnet. Therefore, exposure time does not fluctuate as the shutter blade 9 or 109 is driven by the mechanical force of the driving spring. Naturally, the speed of the armature 3 or the plunger 103 reduces a little in acting on the retaining member 6 or 106, however the fluctuation of the speed can be reduced to a negligible level by providing an idle range for the motion of the armature 3 or the plunger 103 before acting on the retaining member. Although the speed of the armature 3 or 103 is affected by the straining resistance of the additional second driving spring 15 or 115 having almost the same spring force with the driving spring for driving the shutter blade provided for the conventional shutter in which the driving spring is strained during the attraction of the armature, the exposure time will not be fluctuated because the influence of the straining force of the second driving spring 15 or 115 is constant at all times. The exposure itself can be controlled properly according to the speed of attraction of the armature 3 or 103 by regulating the bias of the delay circuit. As shown in FIG. 7, the time t1 from closing of the power switch to starting of the shutter blade 9 or 109 of this invention is longer than that of the conventional shutter, however, the time t1 can be regulated easily by the aforesaid means to properly expose the film (not shown). The effect of the present invention and the operation of the device of this invention when the voltage of the battery drops will be described hereunder. When the voltage of the battery drops, it is well understood that the time from passing the electric current through the solenoid to starting of the armature and the time from starting of the armature to attraction of the armature for a fixed distance are extended because the electromagnetic force of the solenoid is reduced. As shown in FIG. 6b, in the abovementioned conventional shutter, the times t1 and t2 are extended to t1' and t2', respectively, because time of attraction of the armature is extended as shown by dotted lines as the attraction of the armature is affected by the inertia of the shutter blade and the frictional resistance generated by relative movement of the mechanical arrangement. A time $t_0$ controlled by the delay circuit scarcely changes if the voltage of the battery is dropped, therefore, a time t3 from closing of the power switch to starting of aperture closing motion of the shutter blade by cutting off of the electric current flowing through the solenoid also scarecely changes, consequently with, the shutter blade operating as shown by dotted lines, the film is excessively underexposed. At the same time, the times t1' and t2' fluctuate still more. As shown in FIG. 7b by dotted lines, the time of attraction of the armature 3 or 103 also is extended while the time $t_0$ controlled by the delay circuit scarcely changes and the time t3 from closing of the power switch to starting of aperture closing motion of the shutter blade 9 or 109 being constant, the period of duration of electromagnetic attraction of the armature 3 or 103 is reduced, however, as mentioned above, the attraction of the armature 3 or 103 is not affected by the inertia and the frictional resistance of the shutter blade 9 or 109 and the shutter blade actuator 12 or 112, therefore, the time spent for the attraction of the armature 3 or 103 will not be extended as in the conventional shutter if the electromagnetic force is reduced comparable to that of the electromagnetic device used in the conventional shutter by the voltage drop of the battery. The time t2 being kept constant without being affected by the attraction of the armature 3 or 103, and the shutter blade 9 or 109 operating as shown by dotted lines, underexposure is limited within a small degree. This degree of underexposure is not a problem in the shutter speeds commonly used. Detailed explanation will be made on an embodiment referring to FIG. 8 wherein time of exposure, that is, exposure, does not change if the voltage of the battery drops. This stabilized exposure is attained by the provision of the trigger switch 18 or 118 mentioned in the explanation of operation and constitution of FIGS. 1 to 5. According to this constitution, the delay circuit (one motion delay circuit) does not start the action of controlling the fixed time $t_0$ when the power switch has been closed by the shutter releasing operation. The delay circuit starts controlling the time $t_0$ actuated by the trigger switch 18 or 118 which is opened around the end of the armature 3 or 103 attracting process. Accordingly, the time t4 from closing of the power switch to opening of the trigger switch 18 or 118 being extended to t4' and (t1'-t1) being equal to (t4'-t4), the time t₀ controlled by the delay circuit does not change as explained above if the period of attraction of the armature 3 or 103 is extended and the time t1 is extended to t1' by voltage drop of the battery, therefore, the time t3 from opening of the trigger switch 18 or 118 to the start of aperture closing motion of the shutter blade remains unaffected. Thus the time of exposure, that is, exposure, remains unaffected.

At a higher shutter speed, in which the armature 3 or 103 actuates the retaining member 6 or 106 and the trigger switch 18 or 118 in order around the end of electromagnetic attraction of the armature 3 or 103, the shutter speed is not affected by voltage drop of the battery. The trigger switch 18 or 118 may be arranged so as to actuate the delay circuit by charging the integrating condenser when it is opened, or otherwise, may be connected to the integrating condenser in series so as to actuate the delay circuit when it is opened by the attraction of the armature.

Although the invention has been described in its preferred forms wherein the aperture is opened and shut by a part of shutter a single blade, number of the shutter blade the is not limited to only one. The same effect will be obtained by using two shutter blades operating in opposite directions with each other from the center towards the periphery of the shutter aperture, or a construction well known comprising a ring shaped shutter blade driving member arranged to rotate about the center of the shutter aperture (optical axis) and more than three shutter blades.

This invention is not limited to a shutter controlling only the time of exposure, but, for instance, may be practiced in a program EE shutter automatically regulating the time of exposure as well as the aperture depending on the brightness of the object for controlling the combined effects of the time of exposure and the aperture at a constant value by providing shutter blades acting as both the shutter blade and the iris diaphragm, this practice is impossible by the conventional shutter. It will be understood that this invention can be practiced in a shutter of the type wherein exposure is started by actuating a primary blade and, then after a fixed time, the exposure is completed by actuating a secondary shutter blade.

Accordingly, according to the present invention, accurate exposure is obtained over a wider shutter speed range as there is no fluctuation of exposure even within the high shutter speed range, troublesome frequent battery replacement is eliminated as exposure is not affected by voltage drop of the battery, linking of the shutter controlling device with the film winding mechanism and the shutter releasing mechanism mounted on the body of a camera is not necessary so that the construction of the camera is simplified, film winding operation is performed lightly and shutter releasing operation is performed lightly in a short stroke of a lever as the shutter controlling device of the present invention is provide with both shutter charging and shutter releasing functions. The shutter controlling device according to the present invention is also easily mounted on a portable camera of the type wherein the shutter unit and the lense unit are housed or folded in the body of a camera, and constructed in a small size and at a reduced cost as the shutter controlling device is of simple constitution.

We claim:

1. An electromagnetic shutter controlling device for a camera for releasing the shutter to start exposure of a shutter aperture when said device is energized and completing exposure when said device is deenergized comprising: at least one shutter blade for opening and closing the shutter aperture, a first driving spring for driving said shutter blade to close the aperture, an electric delay circuit for controlling the exposure time, an electromagnetic device including an armature attracted by the magnetic force produced by energization of the electromagnetic device and being connected to said electric delay circuit, a second driving spring connected so as to be strained during the course of attraction of said armature so as to drive said shutter blade to open the aperture, and a retaining member for keeping the shutter blade at the aperture closing position until it is actuated to release the shutter blade by the attraction of the armature, said armature being attracted upon energization of said electromagnetic device and operative during the course of attraction for charging said second driving spring and then releasing said shutter blade by releasing said retaining member, said armature being returned when said electromagnetic device is deenergized, said first driving spring driving said shutter blade to close the aperture while returning said armature to the original position when said electromagnetic device is deenergized.

2. An electromagnetic shutter controlling device of claim 1, wherein said first driving spring and said second driving spring are connected so as to be strained to drive said shutter blade to open and to close the aperture respectively, during the course of attraction of said armature.

3. An electromagnetic shutter controlling device of claim 2, wherein said first driving spring is charged during the course of attraction of said armature.

4. An electromagnetic shutter controlling device of claim 1, 2 or 3, further including a trigger switch actuated during the course of attraction of said armature for starting said electric delay circuit.

* * * * *